Figure 1:
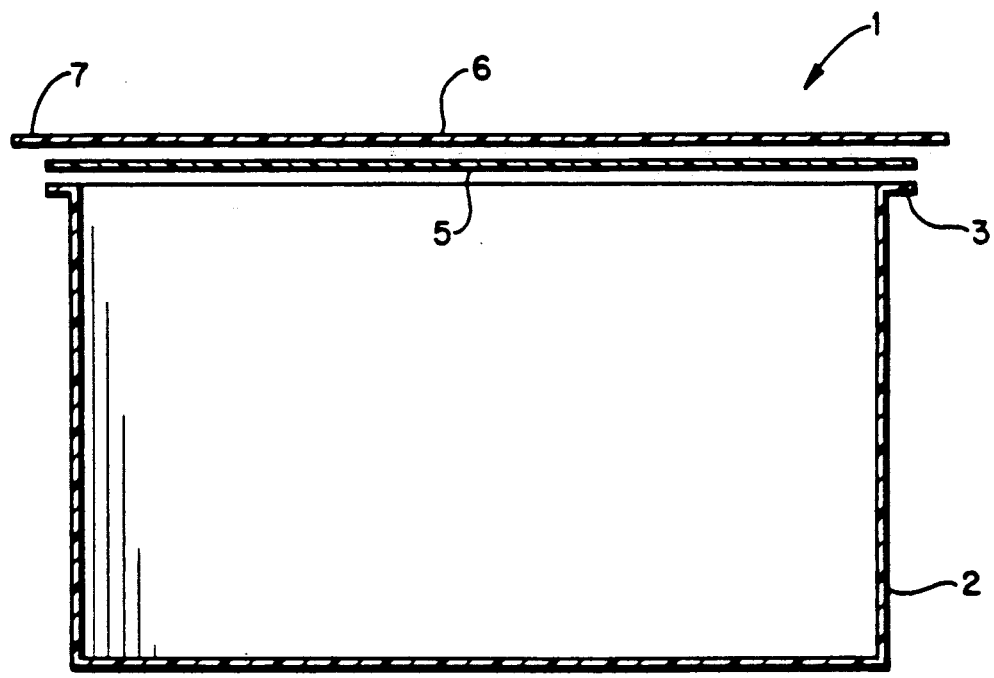

United States Patent [19]

Cassells

[11] Patent Number: 5,054,234
[45] Date of Patent: Oct. 8, 1991

[54] PLANT PACKAGE

[75] Inventor: Alan C. Cassells, Guileen, Ireland

[73] Assignee: 3i Research Exploitation Limited, London, England

[21] Appl. No.: 518,287

[22] Filed: May 4, 1990

Related U.S. Application Data

[63] Continuation of Ser. No. 254,473, filed as PCT GB87/00218 on Apr. 1, 1987, published as WO87/05885 on Oct. 8, 1987, abandoned.

[30] Foreign Application Priority Data

Apr. 2, 1986 [IE] Ireland ................. 857/86

[51] Int. Cl.$^5$ ............................. A01G 9/14
[52] U.S. Cl. ............................. 47/69; 47/84; 206/423
[58] Field of Search ............ 206/484.1, 484.2, 423; 47/84, 1.1, 58, 69

[56] References Cited

U.S. PATENT DOCUMENTS

| | | | |
|---|---|---|---|
| 2,934,204 | 4/1960 | Pardee | 47/84 |
| 3,865,695 | 2/1975 | Massier | 47/1.1 |
| 4,063,383 | 12/1977 | Green | 47/1.1 |
| 4,322,465 | 3/1982 | Webster | 206/484.2 |
| 4,421,235 | 12/1983 | Moriya | 206/484.1 |
| 4,579,223 | 4/1986 | Otsuka | 206/484.2 |
| 4,634,614 | 1/1987 | Holzner | 206/484.1 |
| 4,657,133 | 4/1987 | Komatsu | 206/484.2 |
| 4,769,262 | 9/1988 | Ferrar | 206/484.1 |
| 4,769,945 | 9/1988 | Motoyama | 47/58 |
| 4,790,105 | 12/1988 | Wareing | 47/84 |

FOREIGN PATENT DOCUMENTS

| | | | |
|---|---|---|---|
| 0039115 | 4/1981 | European Pat. Off. | |
| 1242502 | 6/1967 | Fed. Rep. of Germany | 47/84 |
| 2303570 | 8/1974 | Fed. Rep. of Germany | 47/1.1 |
| 1414012 | 6/1965 | France | |
| 8102305 | 1/1982 | Netherlands | 206/423 |
| 8102416 | 3/1981 | World Int. Prop. O. | 206/565 |

Primary Examiner—Henry E. Raduazo
Attorney, Agent, or Firm—Nixon & Vanderhye

[57] ABSTRACT

A package (1) for the production and/or storage of plants, comprising a sealed container (2) for the plants in which at least a portion of the container is a membrane assembly of at least two selectively permeable membrane layers, an innermost membrane (5) having relatively high permeability to both gases and water vapor and an outermost membrane (6) having relatively high permeability to gases but being substantially impermeable to water vapor, said outer membrane layer (6) being strippable from the package leaving the innermost membrane (5) intact.

9 Claims, 1 Drawing Sheet

PLANT PACKAGE

This application is a continuation of application Ser. No. 254,473, filed 4/1/87, now abandoned.

The invention relates to a package particularly for plant source material, a pack of plant source material, a method of producing a pack of plant source material and a method of growing plants using the package.

Commonly available plant source materials are mature plants, seeds for sowing by a purchaser in a growing medium of the purchaser's own choice and pre-sown seeds which having been supplied in a container of dry growing medium such as peat-based compost or vermiculite, in which seeds are pre-sown and germination is triggered by the addition of water by the purchaser. Unskilled growers, as a generalisation, have difficulty in achieving germination of seeds and nurturing the seedlings into maturity. Thus, in season, growing plantlets of flowers and vegetables are usually marketed by nurserymen for transplantation by the purchaser.

Although packaging systems for marketing plantlets have been subject to some improvement over recent years the main unresolved problem is the achievement of an acceptable shelf life for the growing plantlets. Growth of seedlings in open trays, the usual method employed by nurserymen, is largely uncontrolled and shelf life is determined by the rate of growth. While in the care of the skilled nurseryman, the growing rate can be accelerated or retarded to some extent to meet market demand but once the trays of plantlets have been committed to the marketplace in shops and supermarkets that degree of professional care in not usually available.

Many factors affect the shelf life of growing plantlets, for example, illumination conditions and the availability of the correct amounts of water. Enclosing the plantlets in transparent bags of plastics material will prevent moisture loss thus preventing drying out but this practice has the distinct disadvantage of trapping within the bag various gases evolved by the metabolic processes of the plants. These gaseous metabolites may induce or aggravate deterioration of the plants. Also, photosynthesis by the plants requires access to atmospheric oxygen and this necessary free access to ambient atmosphere may be restricted by the moisture-proof barrier presented by common plastics materials. A further detrimental effect of the barrier materials used arises when the purchaser transplants the plantlets to their growing stations. Plants which are grown in a moisture laden environment such as exists within such moisture-proof containers, tend to be soft and are liable to be unable to resist the shock of planting out in the open garden atmosphere because of poorly developed cuticles.

An object of the present invention is to provide an improved packaging system for plantlets.

According to the present invention there is provided a package for the production and/or storage of plants, comprising a sealed container for the plants in which at least a portion of the container is of a membraneous material, characterised in that the membraneous material is a membrane assembly of at least two selectively permeable layers which in combination render the container relatively permeable to deleterious gaseous plant metabolites and oxygen but retentive of water vapour, each layer being strippable successively from the assembly leaving any remaining layer or layers of the assembly intact thereby to increase the permeability of the container to water vapour.

Preferably the package includes a tray having a peripheral outwardly extending flange the inner membrane being sealed to the flange and the or each other membrane is located atop the innermost membrane, the membranes being strippable from the package, leaving any remaining membranes intact.

Preferably the innermost membrane is of plastics film material and is heat sealed to the flange of the tray.

As an alternative to heat sealing, adhesives may be used to adhere the innermost membrane to the container. Any other membranes may also be affixed by adhesives or the outermost membrane may be wrapped around the whole container.

It is preferred that the innermost membrane has a MVTR of greater than 100 and the outermost membrane less than 100 grams per square meter per day.

Another aspect of the invention a pack of plant source material comprises the package defined above together with plant source material therein. The plant source material may comprise propagules which are placed on a culture medium provided in the base portion of the container. Alternatively the plant source material may comprise plant seeds which are sown in a plant growth medium provided in the base portion of the container.

In a preferred embodiment of the invention the base portion of the container is of rigid or semi-rigid plastics material which, preferably, is translucent.

The invention also provides a method of growing plants from a plant source material comprising the steps of placing the plant source in a growing medium in an open-top container, covering the top of the container with a membrane assembly of at least two selectively permeable layers which in combination render the container relatively permeable to deleterious gaseous plant metabolites and oxygen but retentive of water vapour, each layer being strippable successively from the assembly leaving any remaining layer or layers of the assembly intact thereby to increase the permeability of the container to water vapour, propagating or germinating the plant source material to form a plantlet and removing membrane layers successively to acclimatise the plantlet.

Figure 2:
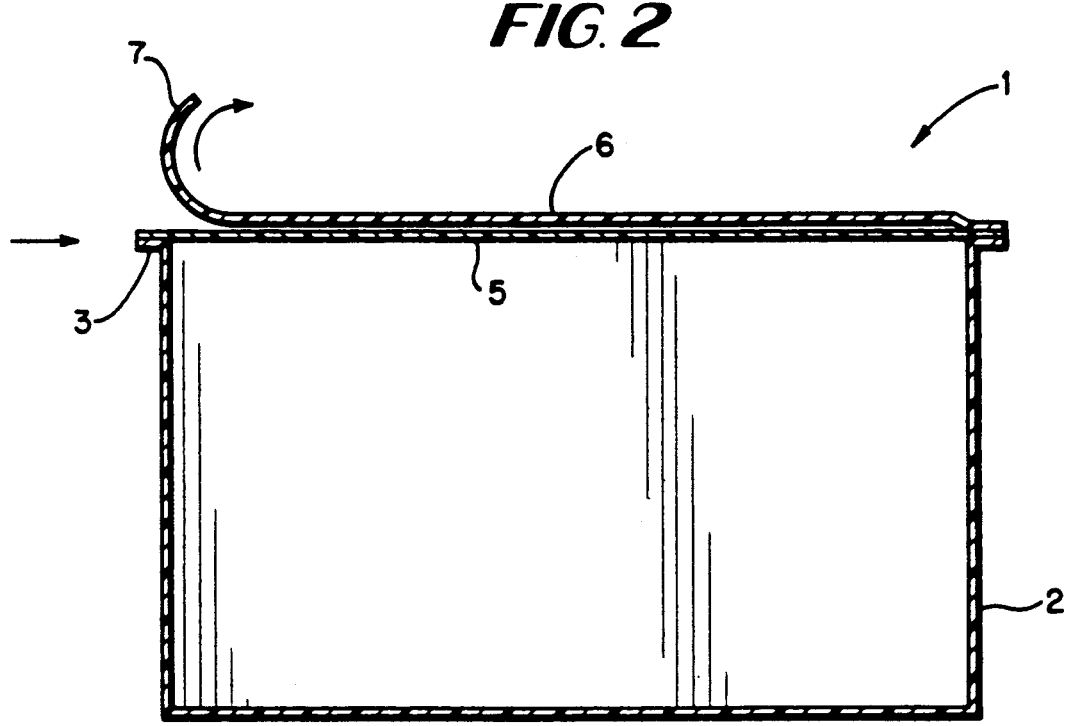

The invention will be more clearly understood from the following description thereof, given by way of example only, with reference to the accompanying drawings in which:

FIG. 1 is a diagrammatic side, partially exploded view of a container for plant source material according to the invention in a propagation and seed germination mode, and FIG. 2 is a side view of the container FIG. 1 in a plant weaning mode.

Referring to the drawings there is illustrated a container indicated generally by the reference numeral 1 for a plant source material. The container 1 comprises a base portion 2 which in this case if of generally rectangular shape having a peripherally outwardly extending flanged rim 3. The base portion 2 is typically of rigid or semi-rigid transparent plastics material such as polyethylene or polypropylene.

A cover for the base portion 2 is provided by an inner membrane 5 and an outer membrane 6 which are both of transparent plastics film material. The inner membrane 5 is typically heat sealed to the flange rim 3 of the base 2 and the outer membrane 6 is heat sealed to the inner membrane 5 and the rim 3. It will be noted that the outer membrane 6 includes a tab portion 7 which allows the outer membrane 6 to be peeled off the inner membrane 5 without rupturing or damaging the inner membrane.

The inner and outer membranes may have different permeabilities, the inner membrane having relatively high permeability to water vapour, oxygen and deleterious gases such as carbon dioxide, ethylene and/or ethane with respect to the permeability of the outer membrane. The membranes may be selected from generally available membranes.

This invention requires selection of the membrane closure materials in accordance with their water and gas permeabilities. In order to demonstrate that the growth of seedlings is improved by the membrane arrangement of the present invention, seeds were grown in packs which were closed by a variety of membrane materials and growth rate of the seedlings was monitored by measurement of the average number of nodes per stem, the shoot length, the stem diameter and the dry weight. These measures were correlated with the permeability of each membrane to water vapour, oxygen, carbon dioxide, ethane, and ethylene.

It will be appreciated that the membrane should have high optical transparency (% T) and should not restrict unduly those wavelengths of light necessary for plant growth. The optical transmission was also noted for each membrane. The higher the transmission the lower will be the demand on artificial illumination during production and hence lower production costs.

Table I below summarises the data established for a variety of membrane materials.

|             | Inner Layer |      |      |       |
| Outer Layer | B    | W    | X    | LA    |
| --- | --- | --- | --- | --- |
| K  | K/B  | K/W  | K/X  | K/LA  |
| T  | T/B  | T/W  | T/X  | T/LA  |
| V  | V/B  | V/W  | V/X  | V/LA  |
| LA | LA/B | LA/W | LA/X | LA/LA |

MICRO PROPAGATION

In this case a culture medium is introduced into the base portion 2 of the container and propagules are placed on the culture medium under aseptic conditions. An inner membrane 5, selected from those materials listed in Table I which have suitable characteristics for this purpose, is then heat sealed to the rim 3 of the container. An outer membrane 6, also selected on the basis of the data given in Table I, is then heat sealed to the inner membrane 5 and the rim 3. As has been stated previously it is preferred that the inner membrane has a MVTR of greater than 100 and the outer membrane less than 100 grams per square meter per day.

In this case the propagation of the propagules is controlled by the permeability of the outer membrane which has relatively low permeability to water vapour. The propagation phase will typically take place during shipment and storage of the container and after a period of time the outer membrane is removed and further growth/acclimatisation of the plants is controlled by the the inner membrane which has high permeability to water vapour. The shelf life of the packaged plants is several weeks longer than that achievable with conven-

TABLE I

| CODE | IDENTITY | MVTR | GASEOUS PERMEABILITY | | | | % T | LENGTH | NODES | STEM DIAM | DRY WEIGHT |
| --- | --- | --- | --- | --- | --- | --- | --- | --- | --- | --- | --- |
|      |             |     | $O_2$ | $CO_2$ | $C_2H_4$ | $C_2H_6$ |     |       |       |       |       |
| B  | 345 PS       | 450 | 7    | 164     | 21     | 49      | 40  | 5.74  | 11.54 | 0.092 | 7.69  |
| E  | Propafilm C34| 50  | 9    | 199     | 33     | 0       | —   | 8.79  | 6.22  | 0.105 | 5.77  |
| J  | Melinex 813  | 40  | 90   | 270     | 0      | 16      | 50  | 3.52  | 7.48  | 0.104 | 7.13  |
| K  | 35μ LDPE     | 13  | 5000 | 30000+  | 20000+ | 19000   | 80+ | 3.14  | 7.61  | 0.095 | 7.62  |
| L  | 250μ PS      | 20  | 250  | 850     | 140    | 29      | 80+ | 3.49  | 8.42  | 0.092 | 7.74  |
| P  | Cellulose    | 1   | 10   | 740     | 0      | 0       | 70+ | 3.63  | 7.71  | 0.114 | 7.09  |
| T  | 25μ LDPE     | 15  | 7500 | 20000+  | 13800  | 9800    | 80  | 3.78  | 9.69  | 0.087 | 6.90  |
| V  | 23μ Polyester| 20  | 50   | (150)   | —      | 2500    | 50+ | 4.51  | 7.35  | 0.077 | 7.32  |
| W  | 35μ Acetate  | 750 | 4000 | 16000+  | 886    | 328     | 80+ | 6.82  | 10.41 | 0.095 | 11.28 |
| X  | 30μ cast Nylon | 200 | 100 | 90     | 0      | 0       | 80  | 4.01  | 9.46  | 0.084 | 7.37  |
| LA | PVC          | 140 | 30000| 140000  | 50000  | 90000+  | 90  | 12.96 | 11.21 | 0.087 | 6.07  |

Note:
PS = polystyrene, and, AC = cellulose acetate

In Table I:

MVTR = moisture vapour transmission rate in g/m²/24 hours at 30° C.

Transmission rates for oxygen, carbon dioxide, ethane, and ethylene are given in cm³/m²/24 hours.

The names Propafilm and Melinex are Trade Marks.

From the data given in Table I, it is possible to correlate the growing characteristics of the plants to the membrane transport characteristics enabling selection of membranes appropriate for the layers of a package of this invention. In the description which follows a two layer membrane assembly will be described but it is to be understood that more than two layers may be used.

Table II below shows particularly desirable membrane pair combinations selected on the basis of the data given in Table I, an outer membrane being selected from those indicated in the left column and an inner from those shown across the top of the Table.

tional distribution methods.

After a period of one week or longer as appropriate, depending on the species of plant and the membrane materials used, the inner membrane is removed and the plants are transferred to soil. While the growth of the plants is under the control of the permeability of the inner membrane water or nutrients may be added aseptically or otherwise to prolong the growth of the plant and assist in acclimatisation.

During the propagation phase water vapour is retained in the container by the outer membrane and the presence of the membrane maintains sterility. Further, the exchange of harmful gases, such as ethylene may be closely controlled. Further, exchange of carbon dioxide and oxygen may be controlled. In this form the container is typically used for storage, transportation or shop display.

When the purchaser removes the outer membrane, water loss from the container occurs reducing the humidity in the container which facilitates hardening of the plants without loss of sterility.

It has been found that with the containers according to the invention there is a high success rate with plants grown in the container and then transferred to the soil. In known arrangements in which micro plants are transferred from conventional containers to soil, there are significant losses.

SEED

In this case the base portion of the container is filled with a growing medium such as compost or peat which may be sterilised or unsterilised as appropriate to the species of plant. The plant seed which may or may not be sterilised is then sown under normal or under aseptic conditions in the substrate. The container is then heat sealed with selected membranes and the seedlings are marketed in this form. When the seedlings have reached a desired size, the outer membrane is peeled off and evaporation acclimatisation is allowed to proceed through the uncovered inner membrane. Again, water or nutrients may be added aseptically or otherwise to the container during this period to prolong growth and acclimatisation.

The plantlets are then transplanted to growing stations in the open soil as appropriate.

When used in this way the container according to the invention overcomes a major problem in distributing seedlings or young plants which hitherto have required special costly storage, transportation and display facilities to prevent desiccation. Hitherto display of such seedlings and young plants in low humidity environments such as supermarkets have been precluded because of high losses which are generally encountered. By using the container according to the invention, the humidity and gaseous exchange in general may be closely controlled.

It will be appreciated that while the invention has been described with reference to a container having two membranes, in some cases it may be preferable to use more than two membranes to provide a controlled growth acclimatisation environment. It will further be appreciated that the thickness of the membranes will be selected to achieve a desired environment.

It will also be appreciated that while the invention has been described with reference to propagation from propagules and seeds the containers according to the invention may also be used for example, in the transportation of cuttings and/or cut flowers to achieve a controlled environment.

I claim:

1. A package for the production and/or storage of plant source material, said package comprising a sealed container of plant source material in which at least a portion of said container is of a membraneous material, said membraneous material being a membrane assembly of at least two selectively permeable membrane layers for sealing said plant source material within said container, said membrane assembly including an innermost membrane relatively permeable to water vapor and an outermost membrane, said membranes in combination rendering said sealed container of plant source material relatively permeable to deleterious gaseous plant metabolites and oxygen but retentive of water vapor, the or each outer membrane being strippable successively from said assembly leaving the remaining innermost membrane of said assembly intact to maintain said container as a sealed container of plant source material and thereby to increase the permeability of the container sealed by said innermost membrane to water vapor and, in which the membrane assembly has two membranes of which the innermost and outermost membranes have moisture vapor transmission rates of greater than 100 and less than 100 grams per square meter per day, respectively.

2. A package as claimed in claim 1, including a tray having a peripheral outwardly extending flange, the innermost membrane being sealed to the flange, the or each other membrane being located atop the innermost membrane.

3. A package as claimed in claim 2, in which the innermost membrane is of plastics film material and is heat sealed to the flange of the tray.

4. A package as claimed in claim 1, in which the innermost membrane is sealed to the tray by an adhesive.

5. A package as claimed in claim 1, in which each member of the assembly is sealed to its adjacent membrane by an adhesive.

6. A method of producing packaged plant material, said method comprising the steps of:
providing a moist growing medium in an open-topped container;
planting plant source material in said medium;
closing said container with a membrane assembly of at least two selectively permeable membrane layers, including an innermost membrane and an outermost membrane, said membranes in combination rendering said container relatively permeable to deleterious gaseous plant metabolites and oxygen but retentive of water vapor, each membrane being strippable successively from said assembly leaving the remaining innermost membrane of the assembly intact to increase the permeability of the container to water vapor; and
culturing the plant source material to form plantlets.

7. A method as claimed in claim 6, in which the plant source material is an ungerminated seed and germination occurs within the closed container.

8. A method as claimed in claim 6, in which the plant source material is a propagule.

9. A method of growing plants, comprising the steps of:
providing a moist growing medium in an open-topped container;
planting plant source material in said medium;
closing said container with a membrane assembly of at least two selectively permeable membrane layers, including an innermost membrane and an outermost membrane, said membranes in combination rendering said container relatively permeable to deleterious gaseous plant metabolites and oxygen but retentive of water vapor, each membrane being strippable successively from the assembly leaving the remaining membrane or membranes of the assembly intact thereby to increase the permeability of the container to water vapor;
culturing the plant source material to form plantlets;
successively stripping membrane layers from the container without disruption of any remaining membranes;
allowing said plantlets to grow in said container for a period of time to form plants; and
transplanting said plants to growing stations in open ambient atmosphere.

* * * * *